(12) United States Patent
Chen

(10) Patent No.: US 9,844,855 B1
(45) Date of Patent: Dec. 19, 2017

(54) WORKPIECE CLAMP DEVICE WITH SINGLE SIDE

(71) Applicant: Po-Shen Chen, Taichung (TW)

(72) Inventor: Po-Shen Chen, Taichung (TW)

( * ) Notice: Subject to any disclaimer, the term of this patent is extended or adjusted under 35 U.S.C. 154(b) by 0 days.

(21) Appl. No.: 15/188,458

(22) Filed: Jun. 21, 2016

(51) Int. Cl.
| | | |
|---|---|---|
| *B25B 1/08* | (2006.01) | |
| *B25B 1/10* | (2006.01) | |
| *F01D 5/32* | (2006.01) | |
| *F01D 5/30* | (2006.01) | |
| *F16M 7/00* | (2006.01) | |

(52) U.S. Cl.
CPC ............. *B25B 1/08* (2013.01); *B25B 1/10* (2013.01); *F01D 5/32* (2013.01); *F01D 5/3038* (2013.01); *F01D 5/323* (2013.01); *F16M 7/00* (2013.01)

(58) Field of Classification Search
CPC .. B27L 7/005; B27L 7/06; B66F 7/243; B66F 19/00; B25B 1/08; B25B 15/08; B25B 1/2405; B25B 1/10; F16M 7/00
USPC ...... 254/104; 416/220 R, 221; 269/229, 231, 269/236, 234
See application file for complete search history.

(56) References Cited

U.S. PATENT DOCUMENTS

| | | | | |
|---|---|---|---|---|
| 2,123,484 A * | 7/1938 | Mafera | ............... | F16M 7/00 254/104 |
| 2,170,690 A * | 8/1939 | Mafera | ............... | F16M 7/00 254/104 |
| 2,524,961 A * | 10/1950 | Cramer, Jr. | ............. | F01B 17/04 254/104 |
| 3,528,691 A * | 9/1970 | Matich, Jr. | ............. | F16D 1/0888 403/314 |
| 4,057,294 A * | 11/1977 | Krekeler | ............... | E02F 9/2816 175/374 |
| 4,736,935 A * | 4/1988 | Vasapolli | ............... | B25B 1/08 269/137 |
| 4,867,428 A * | 9/1989 | Fricker | ............... | B22D 41/34 222/591 |
| H906 H * | 4/1991 | Baggett | ............... | H01F 27/303 254/104 |
| 5,226,637 A * | 7/1993 | Kitaura | ............... | B25B 1/08 269/234 |
| 5,690,546 A * | 11/1997 | Mascola | ............... | B23Q 1/60 269/157 |
| 6,019,357 A * | 2/2000 | Bartsch | ............... | B25B 5/08 269/32 |
| 6,126,158 A * | 10/2000 | Engibarov | ............... | B25B 5/08 269/101 |

(Continued)

*Primary Examiner* — Larry E Waggle, Jr.
*Assistant Examiner* — Mahdi H Nejad
(74) *Attorney, Agent, or Firm* — Jackson IPG PLLC; Demian K. Jackson

(57) ABSTRACT

A workpiece clamp device with single side is disclosed. When a bolt is screwed in relative to a base plane, an elastic member is compressed by a first and a second stop portions and a second clamp surface of a driving block is limited by a second wall surface. A first inclined surface is pushed leftward by a second inclined surface so that a tool is clamped by the first clamp surface and a first wall surface. When the bolt is screwed out relative to the base plane, the elastic member is reset due to the compression of the first and the second stop portions. Since the second clamp surface is limited by a second wall surface, the first inclined surface is pushed rightward by the second inclined surface to move the driving block upward so that the force for clamping the tool is released and the tool is disassembled.

5 Claims, 7 Drawing Sheets

(56) References Cited

U.S. PATENT DOCUMENTS

| | | | |
|---|---|---|---|
| 6,301,810 B1 * | 10/2001 | Fidler | E02F 9/2833 37/455 |
| 7,328,879 B1 * | 2/2008 | Plangetis | F16M 7/00 248/188.1 |
| 8,646,738 B2 * | 2/2014 | Stoob | B64D 11/04 248/188.4 |
| 2008/0296822 A1 * | 12/2008 | Dickson | B25B 5/06 269/254 R |
| 2009/0324414 A1 * | 12/2009 | Helmis | F01D 5/3015 416/220 R |
| 2010/0284805 A1 * | 11/2010 | Uskert | F01D 5/323 415/209.3 |
| 2015/0336241 A1 * | 11/2015 | Engibarov | B25B 1/2405 269/281 |

* cited by examiner

WORKPIECE CLAMP DEVICE WITH SINGLE SIDE

FIELD OF THE INVENTION

The present invention relates to a tool clamp apparatus, and more particularly to a workpiece clamp device with single side.

BACKGROUND OF THE INVENTION

Please reference to Taiwanese patent no. TWM266131, the conventional vise device (or workpiece clamping device) may comprise a base, a fixing jaw, and a plurality of movable jaw. A sliding groove is arranged at a center of the base. A sliding track is arranged at each side of the sliding groove. The fixing jaw is bridged on the two sliding tracks of the base. One end of the fixing jaw is a clamping surface and a first sliding block is arranged under the fixing jaw and screwed with each other with a bolt. The first sliding block is received in the sliding groove of the base so that the fixing jaw is fixed on the base. The movable jaw includes a first inclined block and a second inclined block. One end is of the first inclined block has a first inclined surface and the other end thereof has a clamping surface. A second sliding block is arranged under the first inclined block and screwed with each other a bolt. The second sliding block is received in the sliding groove of the base. One end of the second inclined block has a second inclined surface abutted against the first inclined surface and the other end thereof is a clamping surface. A third sliding block is arranged under the second inclined block and screwed with each other with a blot. When the vise device is operating, a workpiece may be arranged between the fixing jaw and the second inclined block so that the first inclined surface and the second inclined surface may be pushed each other to clamp the workpiece.

However, when the bolt of the second inclined block is screwed out (the workpiece is disassembled), the second inclined block may be stopped between the workpiece and the first inclined surface of the first sliding block due to the structure of the inclined surface to result in the finished workpiece being not able to disassemble from the vise device normally. Besides, before the second inclined block is not clamping the workpiece, it is easy to slide downward due to the weight. The gap size between the fixing jaw and the second inclined block may become smaller so that one hand of the operator must hold the second inclined block and the other hand thereof put the workpiece to a clamping position. It makes the operating process more complicated.

Accordingly, the inventor of the present invention has devoted himself based on his many years of practical experiences to solve this problem.

SUMMARY OF THE INVENTION

In order to solve above mentioned problems, an object of the present invention is to provide a workpiece clamp device with single side which is simplified and easy to be disassembled.

In order to achieve the above object, the workpiece clamp device with single side arranged on a base plane, the device may comprise a movable block, having a main body, a first inclined surface, a first clamp surface, at least one first stop portion, and a first limit portion, the first inclined surface is arranged at a right side of the main body along a length direction thereof, the first inclined surface is inclined from bottom to top and from right to left, the first clamp surface is arranged at a left side of the main body along a width direction thereof, the first limit portion is arranged at each of a front end and a rear end of the main body along the length direction thereof and extended toward the first inclined surface, and the at least one first stop portion is concavely arranged at the first inclined surface; a driving block, arranged adjacent to one side of the movable block having the first inclined surface, the driving block has a driving body, a second inclined surface, a second clamp surface, at least one second stop portion, a second limit portion, and at least one vertical step hole, the at least one vertical step hole is passed through the driving body from top to bottom, the second inclined surface is arranged at one side of the driving body adjacent to the first inclined surface of the movable block, the second inclined surface is arranged corresponding to the first inclined surface and inclined from bottom to top and from right to left, the second clamp surface is arranged at one side of the driving body corresponding to the second inclined surface, the second limit portion is arranged at each of a front end and a rear end of the driving body along a length direction thereof and extended toward the second inclined surface, the second limit portion and the first limit portion are slidably limited to each other, the at least one second stop portion is concavely arranged at the second inclined surface and corresponding to the at least one first stop portion; and wherein a bolt is passing through the at least one vertical step hole, a head portion of the bolt is abutted against the at least one vertical step hole, a screw portion of the bolt is passing through the at least one vertical step hole and screwed with the base plane, the first inclined surface is pushed by the second inclined surface leftward and rightward to achieve the effect of clamping because the bolt is screwed in and screwed out relative to the base plane and simultaneously cooperated with the elasticity of the at least one elastic member.

In some embodiments, the first limit portion is a sliding groove, and the second limit portion is a sliding track.

In some embodiments, the at least one vertical step hole is two vertical step holes.

In some embodiments, the at least one elastic member is one compression spring.

In some embodiments, the at least one first limit portion is two first limit portions, and the at least one second limit portion is two second limit portions.

In some embodiments, the at least one first stop portion is an upward vertical blind hole, and the at least one second stop portion is a downward vertical blind hole.

In some embodiments, the first clamp surface has a plurality of transverse air grooves so that air may be flowed between the transverse air grooves and the tool to clamp firmly while a tool is clamped.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
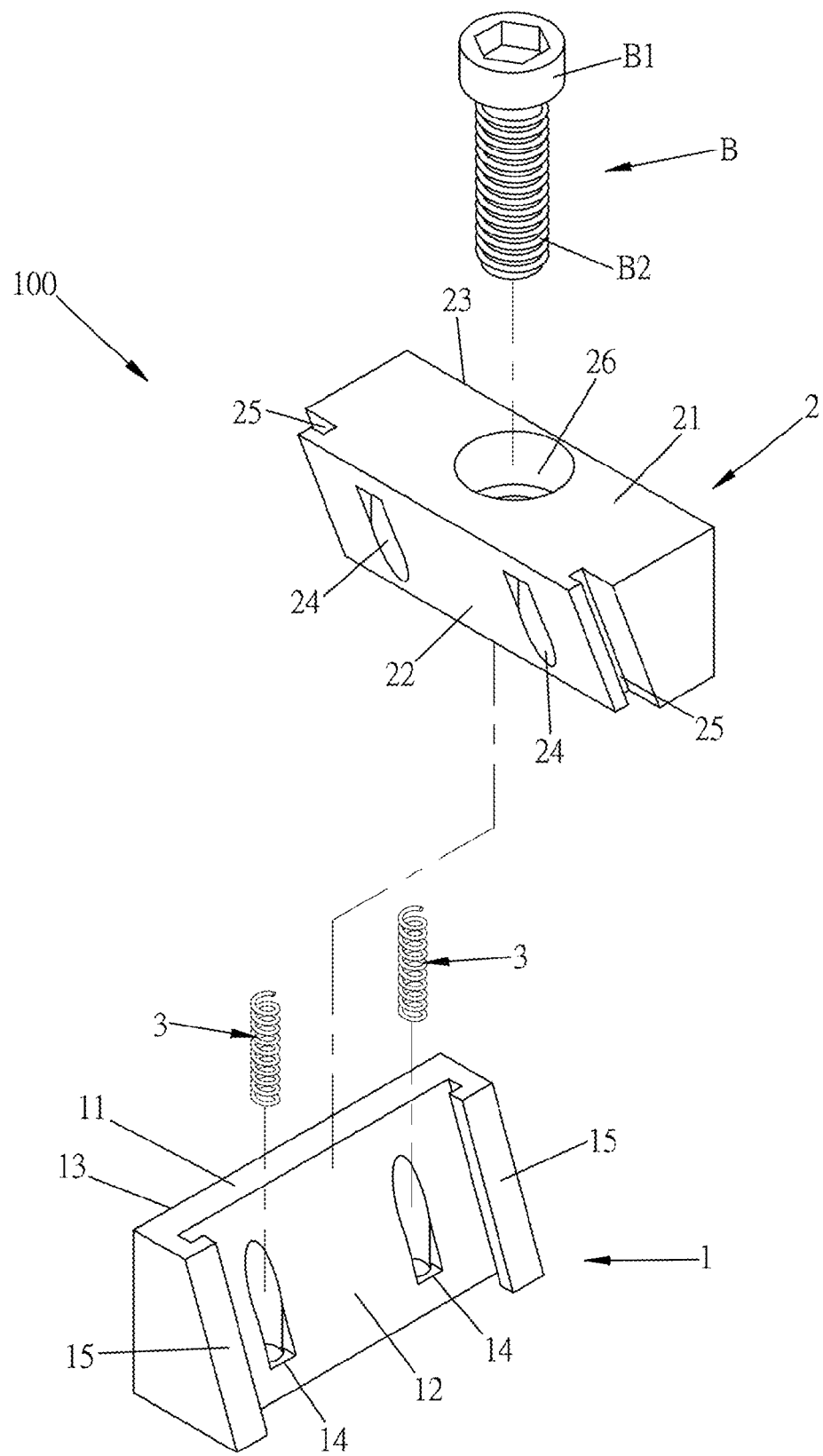
FIG. 1 is an exploded view of a first embodiment of a workpiece clamp device with single side of the present invention.

Referring now to the drawings where like characteristics and features among the various figures are denoted by like reference characters.

Please refer to FIGS. 1 to 5, the workpiece clamp device 100 with single side of the present invention may be arranged on a base plane 300 and comprise a movable block 1, a driving block 2, and at least one elastic member 3.

The movable block 1 may have a main body 11, a first inclined surface 12, a first clamp surface 13, at least one first stop portion 14 (there are two stop potions for illustration, but not limited thereto), and a first limit portion 15. The first inclined surface 12 is arranged at a right side of the main body 11 along a length direction thereof. The first inclined surface 12 is inclined from bottom to top and from right to left. The first clamp surface 13 is arranged at a left side of the main body 11 along a width direction thereof. The first limit portion 15 is arranged at each of a front end and a rear end of the main body 11 along the length direction thereof and extended toward the first inclined surface 12. The at least one first stop portion 14 is concavely arranged at the first inclined surface 12 (that is, two first stop portions 14 are spaced apart from each other and arranged between two limit portions, and further concavely arranged at the first inclined surface 12).

The driving block 2 may be arranged adjacent to one side of the movable block 1 having the first inclined surface 12. The driving block 2 has a driving body 21, a second inclined surface 22, a second clamp surface 23, at least one second stop portion 24 (there are two second stop portions for illustration and the number of the second stop portions is corresponding to the one of the first stop portions, but not limited thereto), a second limit portion 25, and at least one vertical step hole 26. The number of the vertical step hole may be single one (shown in FIGS. 1 to 3) or two (shown in FIGS. 4 and 5). The at least one vertical step hole 26 may be passed through the driving body 21 from top to bottom. The second inclined surface 22 is arranged at one side of the driving body 21 adjacent to the first inclined surface 12 of the movable block 1. The second inclined surface 22 is arranged corresponding to the first inclined surface 12 and inclined from bottom to top and from right to left. The second clamp surface 23 is arranged at one side of the driving body 21 corresponding to the second inclined surface 22. The second limit portion 25 is arranged at each of a front end and a rear end of the driving body 21 along a length direction thereof and extended toward the second inclined surface 22. The second limit portion 25 and the first limit portion 15 are slidably limited to each other. The at least one second stop portion 24 is concavely arranged at the second inclined surface 22 (that is, two stop portions 24 are spaced apart from each other and arranged between the two second limit portions 25, and further concavely arranged at the second inclined surface 22) and corresponding to the at least one first stop portion 14.

Preferably, the first limit portion 15 is a sliding groove and the second limit portion 25 is a sliding track.

Preferably, teach first stop portion 14 is an upward vertical blind hole and each second stop portion 24 is a downward vertical blind hole.

The elastic member 3 may be a compression spring (but not limited thereto). The number of the elastic member may be equal to the one of the first stop portion 14. The elastic member 3 may be arranged between the first stop portion 14 and the second stop portion 24. Two ends of the elastic member 3 are respectively abutted against the first stop portion 14 and the second stop portion 24.

A bolt B (the number thereof may be equal to the one of the vertical step hole) is passing through the corresponding vertical step hole 26. A head portion B1 of the bolt B is abutted against the vertical step hole 26 and a screw portion B2 of the bolt B is passing through the vertical step hole 26 and screwed with the base plane 300. The first inclined surface 12 is pushed by the second inclined surface 22 leftward and rightward to achieve the effect of clamping because the bolt B is screwed in and screwed out relative to the base plane 300 and simultaneously cooperated with the elasticity of the elastic member 3.

Figure 3:
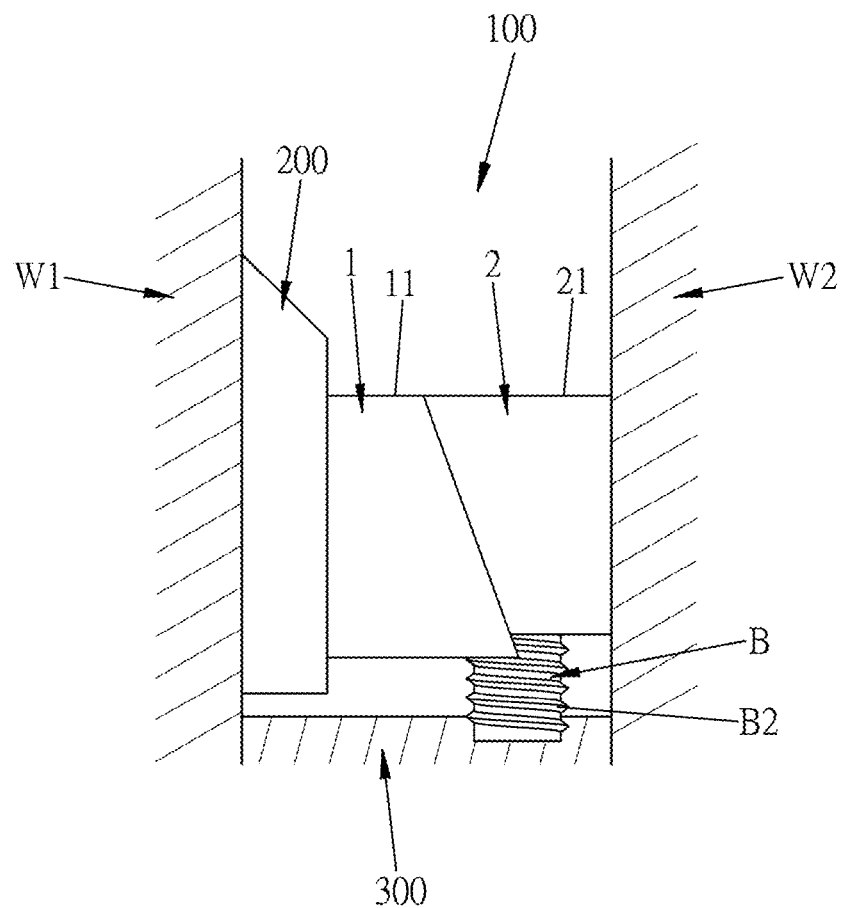
FIG. 3 is a side view of the first embodiment of the workpiece clamp device with single side of the present invention while being in operation.
Figure 4:
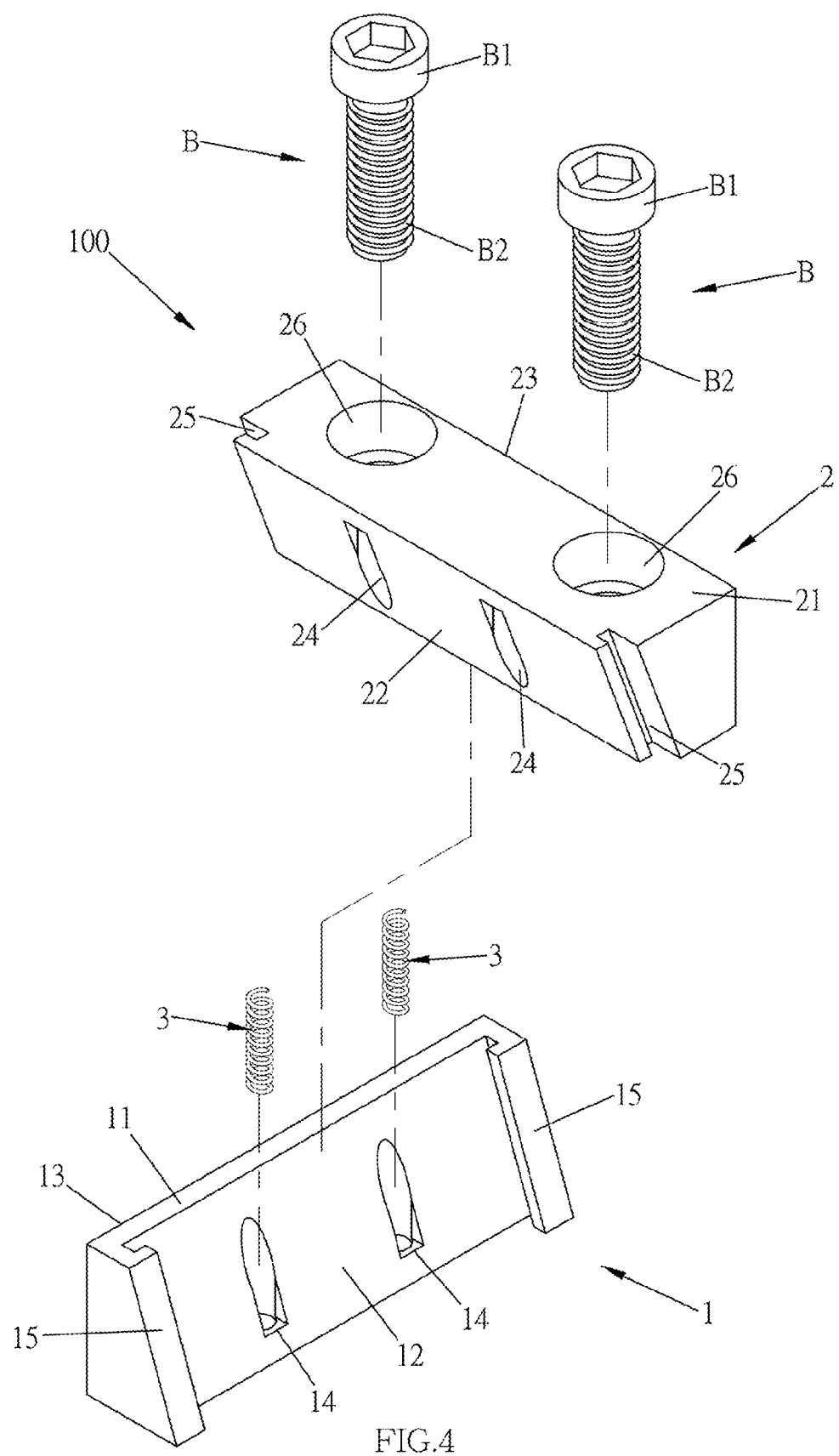
FIG. 4 is an exploded view of a second embodiment of the workpiece clamp device with single side of the present invention.
Figure 5:
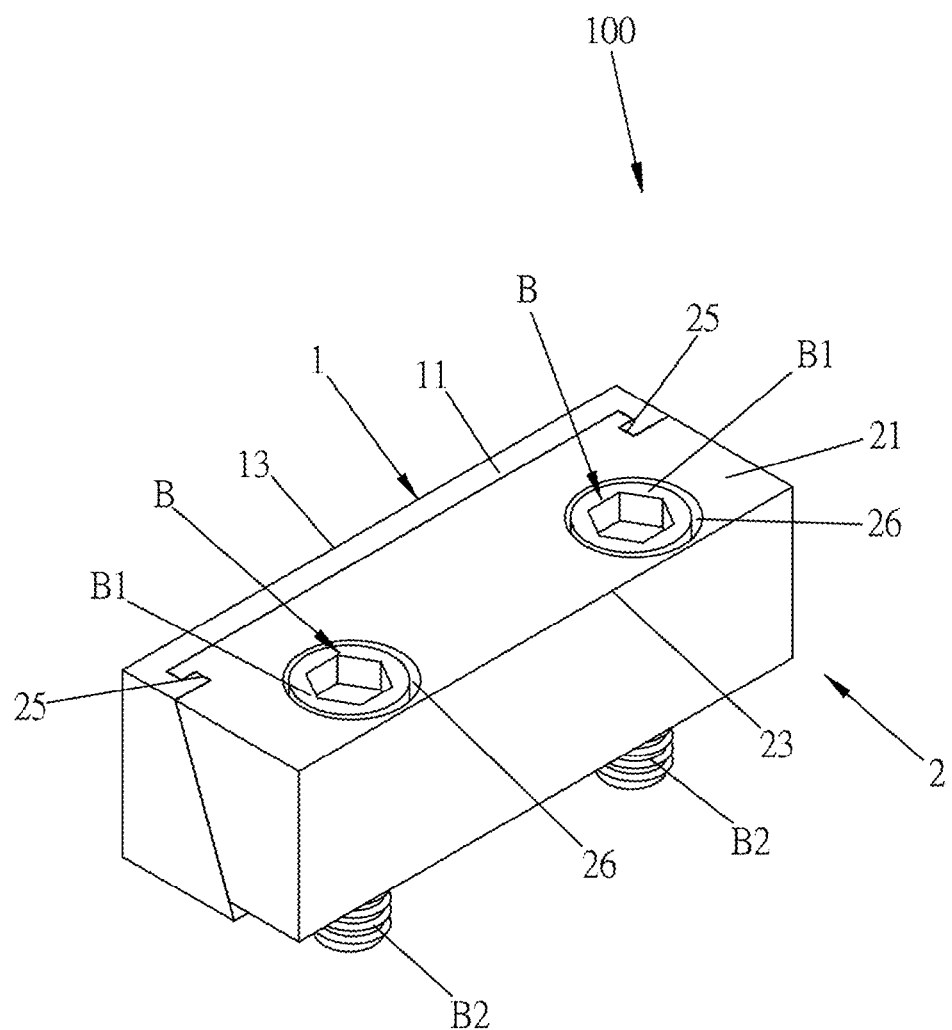
FIG. 5 is a perspective view of the second embodiment of the workpiece clamp device with single side of the present invention.

Please refer to FIGS. 3 and 5, when the bolt B is screwed in relative to the base plane 300, the elastic member 3 is compressed by the first stop portion 14 and the second stop portion 24 and the second clamp surface 23 of the driving block 2 is limited by a second wall surface W2. At this time, the first inclined surface 12 is pushed leftward by the second inclined surface 22 so that a tool 200 is clamped to fix by the first clamp surface 13 and a first wall surface W1 opposite to the second wall surface W2.

Furthermore, when the bolt B is screwed out relative to the base plane 300, the elastic member 3 may be reset due to the compression of the first stop portion 14 and the second stop portion 24. Since the second clamp surface 23 of the driving block 2 is limited by the second wall surface W2, the first inclined surface 12 is pushed rightward by the second inclined surface 22 to make the driving block 2 move upward so that the force for clamping the tool 200 by the first clamp surface 13 and the first wall surface W1 is released and the tool 300 may be disassembled.

According to above mentioned structure, it is simplified and easy to be disassembled.

Figure 2:
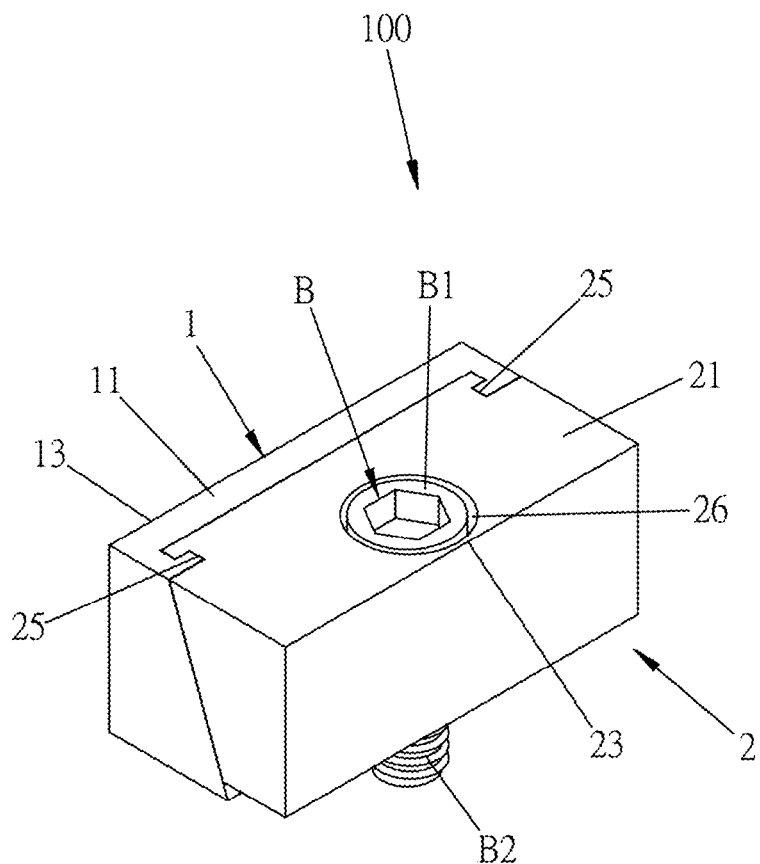
FIG. 2 is a perspective view of the first embodiment of the workpiece clamp device with single side of the present invention.
Figure 6:
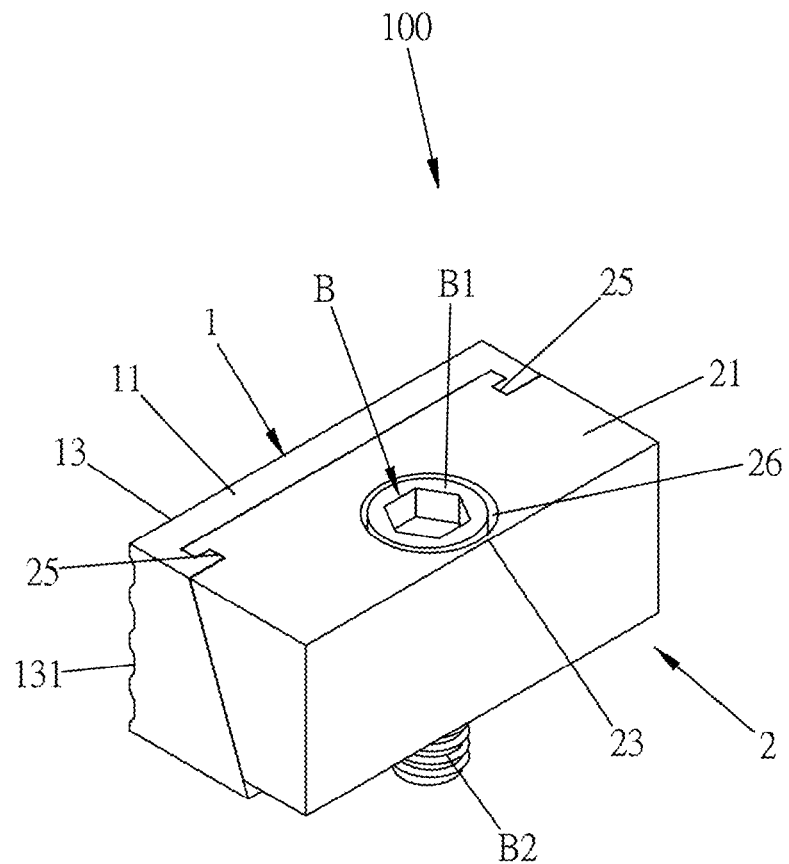
FIG. 6 is a perspective view of a third embodiment of the workpiece clamp device with single side of the present invention.

In addition, please refer to FIG. 6, the first clamp surface 13 of the first embodiment in FIG. 2 has a plurality of transverse air grooves 131. When the tool 300 is clamped shown as in FIG. 3, the transverse air grooves 131 may guide the air flow to dissipate heat and clamp more firmly.

Figure 7:
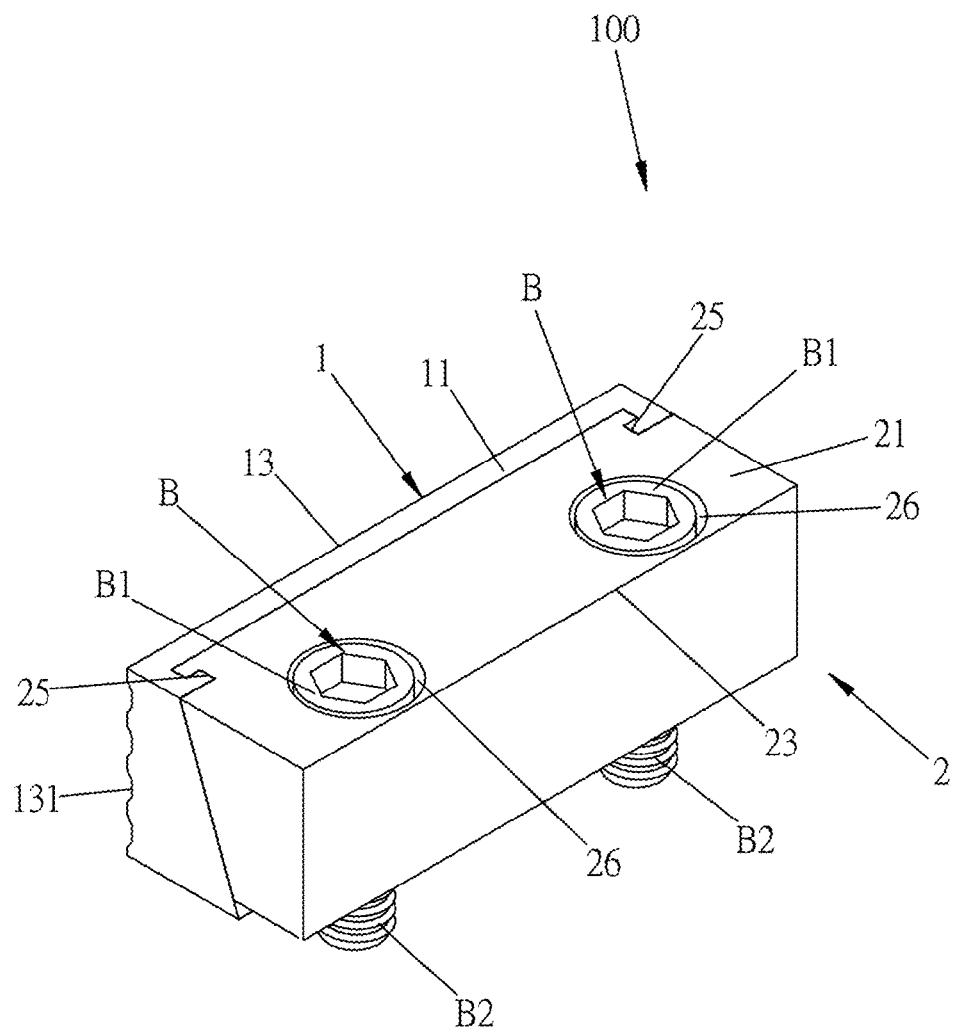
FIG. 7 is a perspective view of a fourth embodiment of a workpiece clamp device with single side of the present invention.

Furthermore, please refer to FIG. 7, the first clamp surface 13 of the second embodiment in FIG. 5 has a plurality of transverse air grooves 131. When the tool 300 is clamped shown as in FIG. 3, the transverse air grooves 131 may guide the air flow to dissipate heat and clamp more firmly.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A workpiece clamp device with single side, arranged on a base plane, the device comprising:
    a movable block, having a main body, a first inclined surface arranged at a right side of the main body and inclined from a bottom to a top in a right to a left inclination, a first clamp surface arranged at a left side of the main body, at least one first stop portion concavely arranged at the first inclined surface, and a first limit portion arranged at each of a front end and a rear end of the main body and extending along the first inclined surface;
    a driving block, arranged adjacent the right side of the movable block and with a driving body, a second inclined surface arranged at a left side of the driving body and adjacent the first inclined surface of the movable block and having a matching inclination from a bottom to a top of the driving block from a right to a left inclination, a second clamp surface arranged at a right side of the driving body, at least one second stop portion concavely arranged at the second inclined surface and corresponding to the at least one first stop portion, a second limit portion arranged at each of a front end and a rear end of the driving body and extending along the second inclined surface such that the second and first limit portions are slidably connected thereby, wherein the first limit portion is a sliding groove, and the second limit portion is a sliding track, and at least one vertical step hole passing through the driving body from the top to the bottom;
    at least one elastic member, arranged between the at least one first stop portion and the at least one second stop portion, two ends of the elastic member are respectively abutted against the at least one first stop portion and the at least one second stop portion; and
    a bolt passing through the at least one vertical step hole, a head portion of the bolt abutted against the at least one vertical step hole, a screw portion of the bolt passing through the at least one vertical step hole and screwed with the base plane, wherein contact between the first inclined surface and the second inclined surface urges the movable block leftward and rightward as the bolt is screwed in and screwed out relative to the base plane and simultaneously cooperated with elasticity of the at least one elastic member.

2. The workpiece clamp device as claimed in claim 1, wherein the at least one vertical step hole is two vertical step holes.

3. The workpiece clamp device as claimed in claim 1, wherein the at least one elastic member is one compression spring.

4. The workpiece clamp device as claimed in claim 1, wherein the at least one first stop portion is an upward vertical blind hole, and the at least one second stop portion is a downward vertical blind hole.

5. The workpiece clamp device as claimed in claim 1, wherein the first clamp surface has a plurality of transverse air grooves so that air may be flowed between the transverse air grooves.

* * * * *